No. 628,274. Patented July 4, 1899.
T. L. MARVEL.
ENDLESS CONVEYER.
(Application filed May 22, 1896.)
(No Model.)
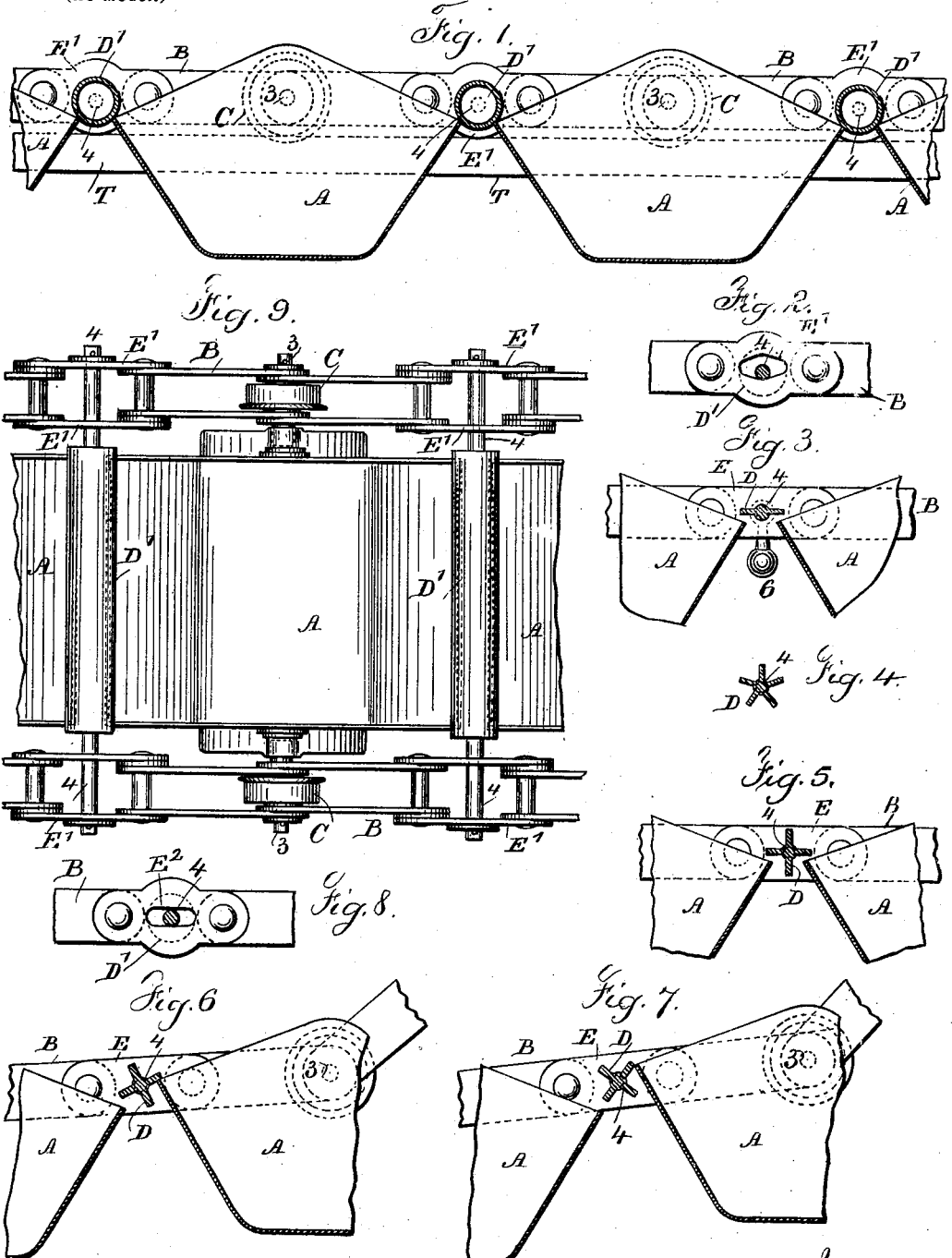

UNITED STATES PATENT OFFICE.

THEODORE L. MARVEL, OF TAUNTON, MASSACHUSETTS.

ENDLESS CONVEYER.

SPECIFICATION forming part of Letters Patent No. 628,274, dated July 4, 1899.

Application filed May 22, 1896. Serial No. 592,589. (No model.)

*To all whom it may concern:*

Be it known that I, THEODORE L. MARVEL, a citizen of the United States, residing at Taunton, in the county of Bristol and State of Massachusetts, have invented an Improvement in Endless Conveyers, of which the following is a specification.

Endless conveyers have been made with a series of pivoted buckets connected by chains or wire ropes at the opposite sides, and these have been supported upon tracks by wheels or rollers and caused to travel from one place to another, so as to transport coal or other material supplied into the buckets at one place and delivered from the same at another place; but difficulty has been experienced in preventing the coal or other material as it runs down from a chute or supply passing between one bucket and the next. To obviate this difficulty, the buckets have been made with lips lapping one over the other; but it has been necessary to change the lap of the lips, so as to allow a bucket to either ascend or descend in its travel without the overlapping of the lips causing the buckets to tip.

The present invention is made with reference to covering the space between the end of one bucket and the next by an automatic shield that is moved by the buckets themselves and drops back to place and sheds the coal or other material, so that it passes into the buckets without dropping down between them. This shield is pivoted at its ends upon the endless chains or ropes, and it is free to turn by contact with the edge of the bucket, and in the different positions that the parts assume the shield will automatically turn or fall into position, so that the material passing down will be diverted into the buckets by the shield and not drop down between such buckets.

In the drawings, Figure 1 is a cross-section representing diagrammatically the adjacent edges of the buckets and the intervening shields. Fig. 2 is an elevation endwise of the rotary shield and representing a bearing for one pivot of the shield. Fig. 3 shows adjacent edges of the buckets and a flat shield. Fig. 4 is a cross-section of a five-leaf shield. Fig. 5 is a section of a shield with four leaves in its normal position. Fig. 6 shows the same parts as one bucket commences to rise. Fig. 7 shows the parts as one bucket is about to separate from its shield. Fig. 8 shows the bearing with an elongated opening for the axis of the shield, and Fig. 9 is a partial plan of the parts shown in Fig. 1.

The buckets A are of any desired size, shape, or configuration, and they are pivoted at 3 upon the chains B, which are provided with rollers C or wheels upon a supporting-track T. These chains, rollers, and track are to be of any desired character. I have represented the chains as composed of plate-links pivoted together; but wire ropes may take the place of chains, and in my Patent No. 567,683, dated September 15, 1896, a conveyer is represented with such wire ropes.

The shields D are provided with pivots 4 at their ends, which pivots are advantageously supported by the chains. I have shown bearings E E' upon such chains for the pivots 4. The shields may be either cylindrical rollers, as shown at D', or longitudinally-grooved rollers approximating in section a four or five or more pointed cross or leaves, as seen at D. When the shields are star-shaped in section, the bearings E for the pivots of the same should be constructed so that the shield simply revolves by contact with the shield of the edge of the bucket, the parts being proportioned in such a manner that the shield will be partly turned by contact therewith of the edge of the bucket as it swings up or down, (see Figs. 6 and 7,) and the edge of the bucket will thus freely clear the shield by turning the same; but in a normal position the projecting edges or leaves of the shield lap over the adjacent edges of the buckets, and it will be borne in mind that as the direction of travel of the endless conveyer may be changed and go either up or down one edge of one bucket will rise above the adjacent edge of the next bucket or descend. Hence these edges will act in unison to give rotation to the shield, and in the turning of the shield any coal or other material that may have lodged upon the shield will be delivered into the lower bucket by the partial revolution of the shield in that direction, and in consequence of the front and back portions of the buckets being inclined, as represented, their edges quickly separate from the shield and the risk of the parts becoming wedged is avoided.

When the shield is made as a cylindrical roller, the openings in the bearings E' are advantageously angular, as shown in Fig. 2, so that the pivots or shafts of the shields can roll up the inclined surface of the angular bearing in either one direction or the other as such shield is pressed laterally by the contact therewith of the swinging edge of the bucket, and as soon as the edge of the bucket separates from the cylindrical shield the pivots thereof roll down to the apex of the angular bearings, and the diameter of the shield is always to be greater than the width between the edge of one bucket and the next, so as to cover the opening, and as the edge of one bucket rises and the edge of the next one passes below the shield is pressed laterally by the ascending edge and its pivots roll up the incline of the bearing and the shield is carried bodily over the edge of the adjacent bucket below, and as the buckets return into a horizontal position the inclined side of the upper bucket presses the cylindrical shield back and the pivots pass up the inclines, and at the same time that the edge of the lower bucket tends to lift the shield and as the parts assume their normal horizontal positions the shield drops and rests upon the adjacent edges of the buckets, so as to effectually cover up the opening between one bucket and the next, and thereby deflect the coal or other material into the buckets and prevent the same passing down between such buckets. In place of the bearings being angular they may be approximately horizontal or curved, as indicated at $E^2$ in the diagram Fig. 8.

When the buckets descend in their travel, a similar action takes place on the shield, and I remark that the axes of the buckets and shields should be in the same horizontal plane, or nearly so, because the upper side of the chain in one part of its movement may become the lower side at another part of its circuit.

In some conveyers the material is received into and delivered from the buckets before they commence their return travel, and in other conveyers there is a twist in the vertical or nearly vertical portion, so that the shields are maintained above the edges of the buckets, where the materials are received and delivered, and it is not necessary to place the pivots of the shields in the same plane as the pivots of the buckets.

If the pivoted shield is moved by a hanging weight 6, Fig. 3, or other device, it will be restored to a normal position by such device instead of being dependent upon contact with the buckets for the movements.

Chains of various characters have been employed for connecting the buckets in endless series and also wire and other ropes for the same purpose. In the present improvement it is to be understood that the term "chains" for connecting the buckets in endless series is intended to include any device that may be employed for this purpose.

I claim as my invention—

1. The combination in a conveyer with the buckets and means for connecting them in endless series, of a shield between the edge of one bucket and the edge of the next, and means for supporting the ends of the shield directly upon the devices that connect the buckets in series, substantially as set forth.

2. The combination in a conveyer with the buckets and chains for connecting them in endless series, of a shield between the edge of one bucket and the edge of the next, and pivots at the ends of the shield supported directly upon the chains, substantially as set forth.

3. The combination with the pivoted buckets in an endless conveyer, of shields covering the spaces between the buckets, pivots for supporting such shields and upon which the shields are permitted to turn by the contact therewith of the buckets, and bearings upon the chains of the endless conveyer for the pivots of the shields, substantially as set forth.

4. The combination with the pivoted buckets in an endless conveyer, of cylindrical shields adapted to rest upon the adjacent edges of the buckets, pivots at the ends of the shields, and bearings upon the chains for the pivots, such bearings having elongated openings for the pivots, substantially as set forth.

5. The combination in a conveyer with the pivoted buckets and chains for connecting them in endless series, of a cylindrical shield between the edge of one bucket and the edge of the next, and pivots for the cylindrical shield supported directly upon the chains, substantially as set forth.

6. The combination with the buckets and the chains for connecting them in endless series, of a shield between the edge of one bucket and the next and end supports for the shield directly upon the chains, such supports allowing a lateral movement to the shield by contact with one of the buckets, substantially as set forth.

Signed by me this 19th day of May, 1896.

THEODORE L. MARVEL.

Witnesses:
GEO. T. PINCKNEY,
S. T. HAVILAND.